United States Patent [19]
Jerabek et al.

[11] 3,878,766
[45] Apr. 22, 1975

[54] GATING MECHANISM

[75] Inventors: Jerry C. Jerabek, Middletown, Conn.; Charles R. Hamilton, China Lake, Calif.

[73] Assignee: The United States of America as represented by the Secretary of the Navy

[22] Filed: May 6, 1974

[21] Appl. No.: 467,173

[52] U.S. Cl. ............... 91/469; 137/68; 137/625.48; 137/625.68; 251/66
[51] Int. Cl. ....................... F15b 15/00; F16k 31/44
[58] Field of Search ................ 251/32, 325; 91/469; 137/68, 625.29, 625.38, 625.48, 625.68

[56] References Cited
UNITED STATES PATENTS

| | | | |
|---|---|---|---|
| 1,690,069 | 10/1928 | Ferris | 91/469 X |
| 2,120,248 | 6/1938 | Hinchman | 251/74 X |
| 3,033,216 | 5/1962 | Morgan et al. | 137/68 |
| 3,145,573 | 8/1964 | Hebenstreit | 74/2 |
| 3,633,596 | 1/1972 | Gerber | 137/68 |

FOREIGN PATENTS OR APPLICATIONS

| | | | |
|---|---|---|---|
| 95,696 | 1/1898 | Germany | 137/625.29 |

*Primary Examiner*—Martin P. Schwadron
*Assistant Examiner*—Richard Gerard
*Attorney, Agent, or Firm*—R. S. Sciascia; Roy Miller; Gerald F. Baker

[57] ABSTRACT

Apparatus for rupturing a seal and routing air pressure to a pressure or pressure-differential sensing device. A ported knife-edged gate valve is slidably positioned within an elongated chamber in a casing and is biased by an energy source from a first inactive position to a second actuated position through a sealed diaphragm into an air stream for creating a new path for air flow. Detent means prevent operation of the device until the detent is released by a lanyard, arming wire or other release mechanism. Multiple air passages within the valve connect the air flow to a differential pressure sensing device. Movement of the valve may also enable activation or may activate other associated mechanisms.

8 Claims, 2 Drawing Figures

GATING MECHANISM

BACKGROUND OF THE INVENTION

The present invention is primarily concerned with a mechanism for controllable utilization of differential pressure to actuate or enable other mechanisms, as for example, in a fuze. More specifically the invention may utilize the differential pressure caused by the flow of air past a vehicle in flight. One of the difficulties heretofore encounter with automatic air stream actuating devices has been premature actuation of the mechanism because of shock or vibration or changes in atmospheric pressures at different altitudes or other causes.

According to the present invention, a seal cutting and gating or actuating device is hermetically sealed within a transporting body or casing and arranged to be released or actuated by a lanyard, pull wire or the like. The combination seal cutting and valve gating mechanism is restrained by a releasable detent member against the bias of a compression spring. When released, the gating mechanism penetrates the seal and places the openings of two internal passages across an open air duct.

DETAILED DESCRIPTION OF THE INVENTION

Figure 1:
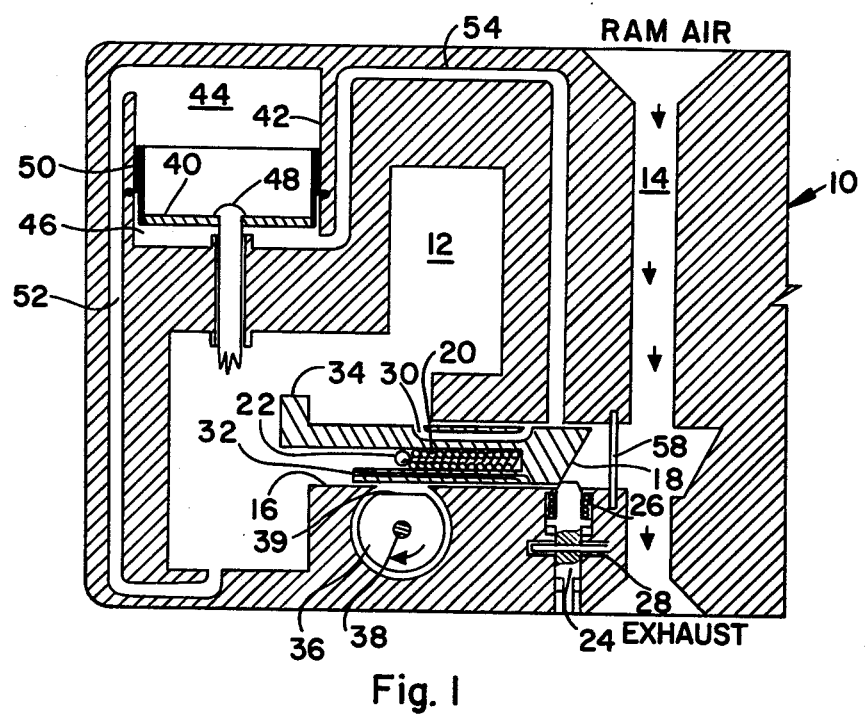
FIG. 1 is a cross sectional view through a typical carrier body in a plane defined by the intersecting axes of the ram air passageway and the gating valve.

Indicated generally at 10 in FIG. 1 is a carrier body or casing having an internal chamber 12 and a through air duct passageway 14. The duct 14 is intersected by an elongated valve chamber 16 communicating with internal chamber 12. Closely fitted within chamber 16 is a gating valve member 18.

In the FIG. 1 device, valve member 18 is shown in a cocked position against a compression spring 20 lying between an inner surface of member 18 and stationary pin 22. Member 18 is retained in this position by a lock or detent 24 which is biased to an unlocked position by a spring 26. Detent 24, however, is prevented from moving to the unlocked position by a pin or wire 28 passing therethrough.

Mating surfaces on detent 24 and valve member 18 also coact to urge detent 24 to release position. Valve member 18 has two internal passage ways 30, 32 and a protruding arm 34. The function of the valve member will become apparent in the explanation of the operation below.

It is contemplated that movement of valve member 18 may actuate or enable one or more other mechanisms by reason of its movement. Thus, in FIG. 1, a disk 36 mounted on a shaft 38 has a flattened portion 39 substantially flush with the internal wall of passageway 16. Assuming that disk 36 is biased in the direction of the arrow, it will be seen that, when the valve member 18 is in the position shown, the disk 36 is prevented from turning.

Also shown within the body of the carrier 10 is a pneumatically operated sensing or operating device including a piston 40 mounted in an opening 42 and separating said opening into two chambers 44, 46. The piston 40 is shown mounted on an actuater shaft 48 and has a rolling rubber diaphragm 50 attached between the periphery of the piston and the walls of opening 42.

Chambers 44 and 46 are connected to passages 52, 54 respectively which communicate with separated portions of valve chamber 16. In the position shown in FIG. 1, valve member 18 effectively blocks passageway 54 and the piston 40 is shown in the lower portion of opening 42. All internal passageways in chamber 12 are hermetically sealed from the air in duct 14 by means of a rupturable seal 58 of plastic or soft metal positioned across chamber 16 at or near its intersection with duct 14.

OPERATION

When it is desired to actuate the system, the pin or wire 28 is extracted from detent 24 by means of a lanyard or like device. Detent 24 acted on by spring 26 releases gating member 18 and the added force of spring 20 acting through the mating surfaces of member 18 and detent 24 cause positive unlocking of member 18. Detent 24 is, therefore, very reliably removed from interference with movement of gating member 18. Thus released, gating member moves to the right as shown in the views of the drawing, cutting the seal 58 and carrying the cut out portion of the seal into a recess at the far right hand end of chamber 16 where it is out of interference with air flow through duct 14. Gating member 18 is brought to a stop at the desired position in chamber 16 by a stop member 34 which comes to rest against a portion of the body of carrier 10.

Figure 2:
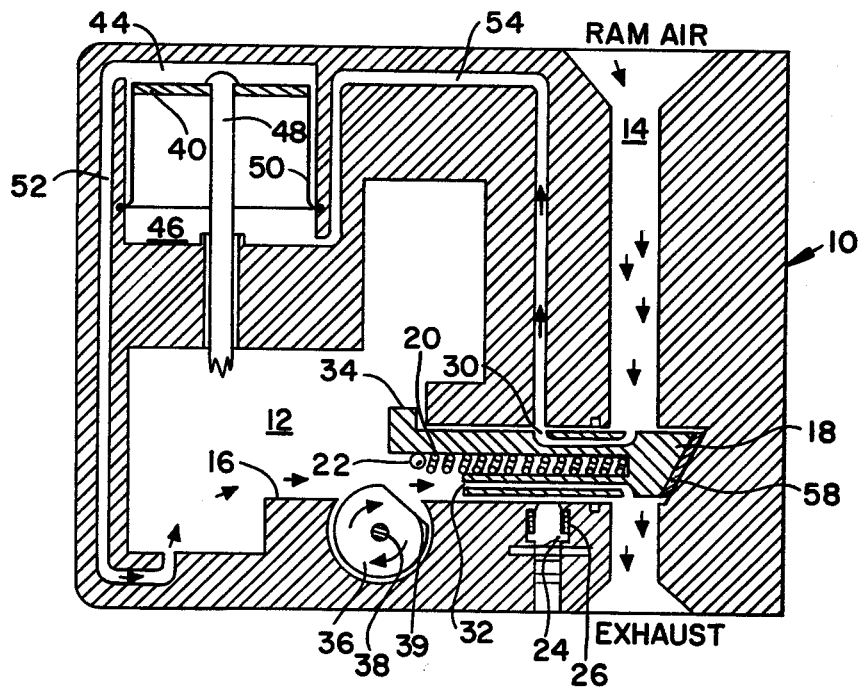
FIG. 2 is a view similar to FIG. 1 showing the gating valve in actuated position.

The fully actuated position is shown in FIG. 2 wherein the passageway 30 provides communication between the high pressure or ram air within duct 14 and the internal passageway 54 leading to chamber 46. Passageway 32 is also placed with an opening in duct 14 on the low pressure or exhaust side and provides communication through internal passageway 52 to the opposing chamber 44. The differential pressure thus created on opposite sides of piston 40 causes the piston to move to the upper position shown in FIG. 2. Movement of piston 40 cause an indicator or other mechanism to be operated through movement of shaft 48. Simultaneously with this action, the body of gating member 18 allows rotation of shaft 38 for operation of another mechanism whenever it has moved out of contact with disk 36.

The views of the drawing are functional and schematic and the cooperation of the gating member with other elements is illustrative and it is contemplated that practical embodiments of the invention may take many different forms.

What is claimed is:

1. Apparatus for causing movement of a mechanism by means of differential fluid pressure comprising:
   a casing member having a duct for conduction of fluid therethrough and an elongated valve chamber intersecting said duct;
   a gating valve member slidably fitted within said chamber for movement between an unactuated and an actuated position;
   fluid motor means including fluid intake and exhaust passages and operating means movable in response to differential pressure between said intake and said exhaust passages;
   first and second fluid passage means within said valve member arranged to be blocked by the walls of said valve chamber when said valve member is in the unactuated position and to provide communication between opposite ends of said duct and said intake and exhaust passages respectively when said valve member is in the actuated position.

2. Apparatus according to claim 1 further comprising:
a rupturable seal across said chamber hermetically sealing said passageway and said valve member from said duct when said valve member is in said unactuated position.

3. Apparatus according to claim 2 further comprising:
an angular face on said valve member effective to cut and remove said seal in movement from said actuated to said actuated position; and
recess means opposite said chamber contoured to receive said angular face of said valve member: so that movement of said valve member from the unactuated position to the actuated position effectively cuts said seal and removes it from interference with fluid flow through said passageway and said duct.

4. Apparatus according to claim 1 further comprising:
stop means movable between a first position holding said valve means in the unactuated position and a second release position out of the path of said valve member;
said stop means being biased toward the release position; and
a removable lock means releasably holding said stop means in said first position.

5. Apparatus according to claim 4 further comprising:
a rupturable seal across said chamber hermetically sealing said passageway and said valve member from said duct when said valve member is in said unactuated position 6. Apparatus according to claim 5 further comprising:
an angular face on said valve member effective to cut and remove said seal in movement from said unatuated to said actuated position; and
recess means opposite said chamber contoured to receive said angular face of said valve member: so that movement of said valve member from the unactuated position to the actuated position effectively cuts said seal and removes it from interference with fluid flow through said passageways and said duct.

7. Means for sensing and utilizing differential pressure created by air movement around a body, the combination comprising:
a vented casing defined by said body;
said casing having a duct therethrough with a ram air entry port and an exhaust port;
said casing also having an elongated valve chamber orthogonally intersecting said duct;
gating valve means situated in said valve chamber and including a solid elongated valve body member slidably fitted within said valve chamber;
biasing means acting upon said valve means in a direction to place said valve means in a valve open position athwart said duct;
stop means acting against a surface of said valve means for retaining said valve means against said biasing means in a valve closed position clear of said duct;
securing means maintaining said stop means in position to restrain said valve member;
means for removing said securing means;
a plurality of valve passageways in said valve member;
a like plurality of casing passageways in said casing having at least one port opening within said valve chamber; at least one valve passageway having entry and exit ports providing communication between the ram air entry portion of said duct and a first casing passageway in said valve oepn position;
a second valve passageway providing communication from a second casing passageway to said exhaust in said valve open position and said valve passageways arranged to be blocked by the walls of said valve chamber in said valve closed position; and
pneumatically operable sensing means connected between said first and second casing passageways.

8. Apparatus of claim 1 wherein said valve chamber is sealed from said through passageway by means of a rupturable seal and movement of said valve body from the restrained position to the unrestrained position causes said valve body to rupture said seal.

* * * * *